United States Patent Office 3,000,284
Patented Sept. 19, 1961

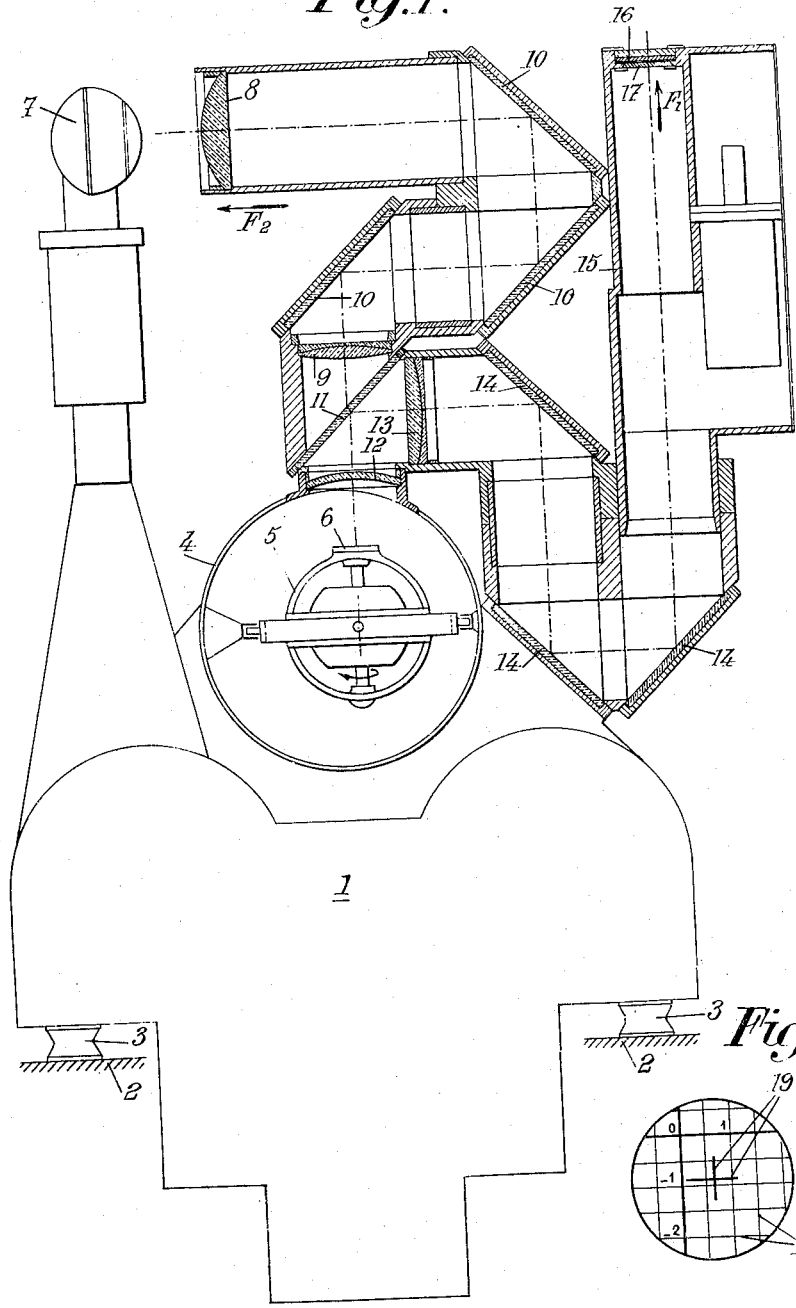

1

3,000,284
DEVICES FOR DETERMINING THE ORIENTATION IN SPACE OF AN APPARATUS AT A GIVEN TIME
Bernard Louis Yves Dubuisson, Paris, France, assignor to Société Francaise d'Optique et de Mécanique, Rueil-Malmaison, France, a corporation of France
Filed May 15, 1959, Ser. No. 813,548
Claims priority, application France, May 16, 1958
3 Claims. (Cl. 95—12.5)

The present invention relates to devices for determining the orientation in space of an apparatus at a given time, the term "orientation" being meant to indicate the angle made by a straight line fixed with respect to the apparatus with a reference straight line of a fixed system of coordinates.

The invention is more especially, although not exclusively, concerned with the case where the apparatus above referred to is a photographic camera mounted on an aircraft to take photographs for the production of maps.

According to the present invention, there is mounted, on the same support as that carrying the above mentioned apparatus, a gyroscope the rotor of which is entirely free to maintain its orientation in space, the variations of position of said apparatus with respect to the spin axis of said rotor being indicated by any suitable means.

A preferred embodiment of the present invention will be hereinafter described with reference to the accompanying drawing, given merely by way of example and in which:

FIG. 1 shows, partly in diagrammatic elevation and partly in vertical section, a photographic camera provided with a device according to the present invention to determine the orientation in space of said camera.

FIG. 2 shows an image obtained on a film with the device of FIG. 1.

In the following description, it will be supposed that photographic camera 1 mounted on a support 2 carried by an aircraft, for instance through the intermediate of resilient abutments 3 capable of absorbing vibrations, is intended to take aerial photographs for establishing a map.

In order to make this map from the aerial photographs obtained with camera 1, it is necessary to know the orientations of said camera at the respective times at which the pictures have been taken by the camera.

This orientation may be obtained by comparing portions of two successive pictures which overlap each other, but this operation requires costly and delicate optical apparatus and/or the solution of difficult analytic problems.

In order to simplify this operation, it has already been proposed to determine, at the same time as each picture is being taken, the direction of the sun or that of the horizon with respect to the photographic camera, but the apparatus necessary to perform this operation is complicated and of very large dimensions. Furthermore, such apparatus can only be used when the sun is shining or when the horizon is clearly visible over a substantial distance.

It has also been proposed, for the same purpose, to indicate the relative position of the spin axis of a gyroscope kept in vertical position by means of erector or other equivalent means, but the orientation of such an axis is subject to variations of the speed and direction of the aircraft and the errors which result from such variations may be as high as ten minutes, which cannot be permitted for tracing a map.

The device according to the present invention is essentially characterized by the use of at least one free gyroscope, that is to say a gyroscope the rotor of which is so mounted on its support that the spin axis of said rotor

2 has its orientation practically uninfluenced by movements of said support in space, the only displacements of said axis being due to a movement of precession, which is linear and can be easily corrected (the errors due to the rotation of earth, to Coriolis acceleration and to the convergence of the verticals from one point to another being also corrected through known means).

Such a gyroscope may for instance be constituted by transforming a gyroscope controlled by an external acceleration (such as gravity) so as to eliminate the control means (such as eccentric weights) included therein.

It comprises for instance a rotor, driven at constant speed by an electric motor fed with three-phase current or in any other way, said rotor being connected to its cage through gimbal means mounted on ball bearings, so that said rotor can pivot about two axes perpendicular to each other and which intersect each other at the center of gravity of the rotor.

Suitable means, well known in the art, may be provided to make, at the beginning of the measurements, the plane in which the rotor is rotating parallel to the reference plane of its casing, which is for instance substantially horizontal when the aircraft is to move along a rectilinear horizontal path.

The present invention does not contemplate determining the nadir point or the horizon because such a determination would require the use of conventional gyroscopes, which are asymmetrical and therefore sensitive to accidental accelerations.

In the embodiment shown by the drawing, camera 1 carries the casing 4 of such a free gyroscope (diagrammatically indicated at 5 on FIG. 1) provided with a flat mirror 6 mounted in such manner as to remain exactly in its initial orientation, close to the horizontal position, during a series of photographic operations.

The device includes, rigidly mounted with respect to said casing:

A source of light 7, such as a "flash" lamp;

A graduated scale 8 constituted by a multiplicity of cross lines;

A first objective 9 the object focal plane of which is the plane of said scale;

Mirrors 10 capable of bending the optical axis of the apparatus so as to reduce the overall dimensions thereof;

A semi-transparent and semi-reflecting plate 11 on the exit side of objective 9;

A window 12 provided in the casing 4 of the gyroscope;

A second objective 13 with mirrors 14, arranged in the same manner as mirrors 10 so as to reduce the dimensions of the whole apparatus;

And a photographic camera 15 carrying a photosensitive film 16 located in the image focal plane of objective 13.

These elements are mounted in such manner that the light beam from source 7 passes through scale 8, is reflected on mirrors 10, passes through objective 9 at the exit of which it forms a beam of parallel rays, passes through plate 11 and window 12, is reflected on mirror 6 carried by the inner gimbal ring of the gyroscope, passes again through window 12, is reflected on plate 11, passes through objective 13 and forms on film 16 the enlarged image of a portion of scale 8.

It will be readily understood that the position of this image is different according to the position of mirror 6 with respect to the casing 4 of the gyroscope, that is to say according to the transverse and longitudinal inclination of the aircraft with respect to the reference plane. It corresponds to the central portion of the scale only if the light beam is reflected exactly upon itself by mirror 6, that is to say if the aircraft is not inclined with respect to the initial position of the middle plane of the gyroscope rotor.

Preferably, there is provided just in front of film 6 a glass plate 17 carrying two lines engraved therein and at right angles to each other.

In this case, the image recorded on the film is similar to that shown by FIG. 2 where 18 designates the image of scale 8 and 19 that of the cross carried by plate 17. If these images are those obtained directly (the negative film being observed in the direction of arrow $F_1$) by the device shown by FIG. 1, and if the general direction of displacement of the aircraft is that of arrow $F_2$, it corresponds to an aircraft climbing under an angle of 0.65 grade and banking toward the right at an angle of 0.90 grade.

If $f$ is the focal distance of objective 9 and $f'$ that of objective 13, the system operates with a magnification equal to $2f'/f$. It is possible to determine the sensitivity of the device by a suitable choice of the objectives, so as to obtain practically a sensitivity of $\frac{1}{100}$ of a grade.

Of course, any suitable means may be provided to obtain the recording of the images at the same time as the aerial photographs are taken.

According to a first embodiment, lamp 7 is caused to send a light beam at the time when light penetrates into the photographic camera 1 due to the opening of the shutter thereof, for instance by making use of a photoelectric cell responsive to said opening of the shutter and capable of operating any electronic circuit to operate lamp 7. It is also possible to make use of a microcontact arranged to be actuated at the same time as the shutter is operated so as to close a suitable electric circuit of lamp 7.

In these cases, camera 15 is not provided with a shutter, but the optical device must be protected against the action of any light other than that emitted by lamp 7.

According to a modification, camera 15 is provided with a shutter the operation of which is synchronized with that of the shutter of camera 1, scale 8 being kept constantly illuminated.

According to still another modification, film 16 belongs to the main film which passes through camera 1, and the image which indicates the orientation of said camera is formed in a margin or in a corner of the corresponding aerial photograph, preferably at the same time as said photograph is taken, the two images being advantageously obtained by means of two distinct synchronized shutters.

Such arrangements are given merely by way of example.

With the device according to the present invention, the variations of orientation of the successive pictures taken by camera 1 are indicated by the images obtained in camera 15.

The device might include a second free gyroscope capable of supplying, in a manner similar to that above described, the variations of orientation of the camera or similar apparatus in a third plane of reference, for instance in the horizontal plane (the axis of said second gyroscope being then horizontal) if the two first mentioned planes are those in which the aircraft axis can be displaced transversely and longitudinally, respectively.

According to still another modification, the optical means fixed with respect to the spin axis of the gyroscope rotor could be, instead of a flat mirror, a concave or convex mirror, or a prism, or any other optical means for deflecting the light beam issued from source 7 as a function of the relative position of said axis with respect to the casing of the gyroscope.

The means for indicating the variations of relative orientation of the axis of the gyroscope rotor, instead of being optical, might be electrical and consist for instance of high accuracy potentiometers.

The photosensitive film 16 might be replaced or complemented by a direct observation device such as a frosted glass plate, recording of the indications visible thereon being effected in any suitable manner, either manually, or electrically, or in any other way.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a system including a moving support and an apparatus carried by said support, a device for determining the orientation in space of said apparatus at a given time, which device comprises, in combination, a gyroscope including a rotor having a spin axis and a center of gravity, means for freely mounting said gyroscope on said support, said means being entirely balanced about the center of gravity of said rotor, so as to make the orientation of said rotor substantially free from influence by movements of said support in space, optical means for indicating the orientation of said apparatus at a given time with respect to the spin axis of said rotor, and an optical system including a light source, means operatively disposed with respect to said source for the projection of an image, a first objective, a system of mirrors between said objective and the latter said means for directing said image through said objective, a semi-transparent and semi-reflecting plate between said optical means and first objective, the image passing through said plate onto said optical means, a light responsive means, and a system of mirrors between said plate and light responsive means, the image being reflected by said optical means, said plate, and the second said system of mirrors onto said light responsive means.

2. In a system including an aircraft and a photographic camera carried by said aircraft, a device for determining the orientation in space of said camera at a given time, which device comprises, in combination, a gyroscope including a rotor having a spin axis and a center of gravity, means for freely mounting said gyroscope on said support said means being entirely balanced about the center of gravity of said rotor, so as to make the orientation of said rotor substantially free from influence by movements of said support in space, optical means including an element fixed in position with respect to the spin axis of said gyroscope, and an optical system including a light source, means operatively disposed with respect to said source for the projection of an image, a first objective, a system of mirrors between said objective and the latter said means for directing said image through said objective, a semi-transparent and semi-reflecting plate between said optical means and first objective, the image passing through said plate and onto said optical means, a light responsive means, and a system of mirrors between said plate and light responsive means, the image being reflected by said optical means, said plate, and the second said system of mirrors onto said light responsive means.

3. A device according to claim 2 in which said element is a light reflecting element having a plane reflecting surface located at right angles to the spin axis of said rotor and at a fixed distance from said rotor.

References Cited in the file of this patent

UNITED STATES PATENTS

| 2,047,070 | Horner | July 7, 1936 |
| 2,273,876 | Lutz et al. | Feb. 24, 1942 |
| 2,756,653 | Nistri | July 31, 1956 |

FOREIGN PATENTS

| 650,826 | Great Britain | Mar. 7, 1951 |
| 669,959 | Great Britain | Apr. 9, 1952 |